US008560517B2

(12) United States Patent
Yang et al.

(10) Patent No.: US 8,560,517 B2
(45) Date of Patent: Oct. 15, 2013

(54) OBJECT RETRIEVAL USING VISUAL QUERY CONTEXT

(75) Inventors: Linjun Yang, Beijing (CN); Bo Geng, Beijing (CN); Xian-Sheng Hua, Bellevue, WA (US); Yang Cai, Beijing (CN)

(73) Assignee: Microsoft Corporation, Redmond, WA (US)

(*) Notice: Subject to any disclaimer, the term of this patent is extended or adjusted under 35 U.S.C. 154(b) by 54 days.

(21) Appl. No.: 13/176,279

(22) Filed: Jul. 5, 2011

(65) Prior Publication Data

US 2013/0013578 A1    Jan. 10, 2013

(51) Int. Cl.
*G06F 17/30* (2006.01)

(52) U.S. Cl.
USPC .......... 707/708; 707/729; 707/731; 382/170; 382/305

(58) Field of Classification Search
USPC .................. 707/748, 708, 765; 382/170, 305
See application file for complete search history.

(56) References Cited

U.S. PATENT DOCUMENTS

| 7,043,474 | B2 | 5/2006 | Mojsilovic et al. | |
|---|---|---|---|---|
| 7,657,126 | B2* | 2/2010 | Gokturk et al. | 382/305 |
| 7,725,484 | B2 | 5/2010 | Nister et al. | |
| 7,882,124 | B2* | 2/2011 | Slaney et al. | 707/765 |
| 8,194,986 | B2* | 6/2012 | Conwell | 382/224 |
| 2006/0056687 | A1* | 3/2006 | Brandt | 382/167 |
| 2007/0071323 | A1 | 3/2007 | Kontsevich et al. | |
| 2007/0203904 | A1* | 8/2007 | Ren et al. | 707/5 |
| 2008/0120290 | A1 | 5/2008 | Delgo et al. | |
| 2008/0205795 | A1 | 8/2008 | Marques et al. | |
| 2008/0273795 | A1* | 11/2008 | Ofek et al. | 382/170 |
| 2010/0135582 | A1* | 6/2010 | Gokturk et al. | 382/195 |
| 2010/0166339 | A1* | 7/2010 | Gokturk et al. | 382/305 |
| 2010/0183225 | A1* | 7/2010 | Vantaram et al. | 382/173 |
| 2010/0189354 | A1 | 7/2010 | de Campos et al. | |
| 2010/0226564 | A1 | 9/2010 | Marchesotti et al. | |
| 2011/0142335 | A1* | 6/2011 | Ghanem et al. | 382/165 |
| 2012/0039527 | A1* | 2/2012 | Qi et al. | 382/159 |
| 2012/0092357 | A1* | 4/2012 | Wang et al. | 345/581 |

OTHER PUBLICATIONS

Aggarwal et al., "Content Based Medical Image Retrieval: Theory, Gaps and Future Directions," retrieved from <<http://www.icgst.com/gvip/volume9/Issue2/P1150845461.pdf>>, ICGST-GVIP Journal, ISSN 1687-398X, vol. (9), Issue (II), Apr. 2009, 11 pages.

(Continued)

*Primary Examiner* — Debbie Le
(74) *Attorney, Agent, or Firm* — Lee & Hayes, PLLC

(57) ABSTRACT

Some implementations provide techniques and arrangements to perform image retrieval. For example, some implementations identify an object of interest and a visual context in a first image. In some implementations, a second image that includes a second object of interest and a second visual context may be compared to the object of interest and the visual content, respectively, to determine whether the second image matches the first image.

20 Claims, 9 Drawing Sheets

(56) References Cited

OTHER PUBLICATIONS

Allan et al., "Challenges in Information Retrieval and Language Modeling: report of a workshop held at the center for intelligent information retrieval, University of Massachusetts Amherst, Sep. 2002" retrieved at <<http://dx.doi.org/10.1145/945546.945549 >>, SIGIR Forum, vol. 37, No. 1, 2003, pp. 31-47.

Bai et al., "A Geodesic Framework for Fast Interactive Image and Video Segmentation and Matting," retrieved at <<http://dx.doi.org/10.1109/ICCV.2007.4408931>>, in ICCV '07: Proceedings of the 11th IEEE International Conference on Computer Vision., 2007, pp. 1-8.

Belkin, "Some(what) Grand Challenges for Information Retrieval," retrieved at <<http://www.sigir.org/forum/2008J/2008j-sigirforum-belkin.pdf>>, SIGIR Forum, vol. 42, No. 1, (c) 2008, pp. 47-54.

Callan et al., "Context-based Information Access," retrieved at <<http://dada.cs.washington.edu/nsf2003/final-reports/nsf_idm03_contextbasedinfoaccess.pdf>>, Report of the Discussion Group on Context-Based Information Access of the Workshop on "Information Retrieval and Databases: Synergies and Syntheses", 2003, 5 pages.

Datta et al., "Image Retrieval—Ideas, Influences, and Trends of the New Age," retrieved at <<http://infolab.stanford.edu/~wangz/project/imsearch/review/JOUR/datta.pdf>>, ACM Computing Surveys, vol. 40, No. 2, 2008, pp. 1-60.

Deng et al., "ImageNet: A Large-scale Hierarchical Image Database," retrieved at <<http://citeseerx.ist.psu.edu/viewdoc/download?doi=10.1.1.155.1729&rep=rep1&type=pdf>>, in CVPR '09: Proceedings of 2009 IEEE Conference on Computer Vision and Pattern Recognition, Jun. 2009, pp. 248-255.

Galleguillos et al., "Context based object categorization: A critical survey," retrieved at <<http://vision.ucsd.edu/sites/default/files/cviu_context_review.pdf, Computer Vision and Image Understanding (CVIU), vol. 114, (c) 2010, pp. 712-722.

Geng et al., "A Study of Language Model for Image Retrieval," retrieved at <<http://ieeexplore.ieee.org/stamp/stamp.jsp?tp=&arnumber=5360512>>, in ICDMW '09: Proceedings of the 2009 IEEE International Conference on Data Mining Workshops, Washington, DC, 6 pages.

Google Goggles, retrieved on May 9, 2011 at <<http://www.google.com/mobile/goggles/>>, 1 page.

Itti et al., "A Model of Saliency-based Visual Attention for Rapid Scene Analysis," retrieved at <<http://www.lira.dist.unige.it/teaching/SINA_08-09/papers/itti98model.pdf>>, IEEE Transactions on Pattern Analysis and Machine Intelligence, vol. 20, No. 11, Nov. 1998, pp. 1254-1259.

Kennedy et al., "How Flickr Helps us Make Sense of the World: Context and Content in Community-Contributed Media Collections," retrieved at <<http://dx.doi.org/10.1145/1291233.1291384 >>, in MM '07: Proceedings of the 15th International Conference on Multimedia, New York, NY, USA, ACM, 2007, pp. 631-640.

Lafferty et al., "Document Language Models, Query Models, and Risk Minimization for Information Retrieval," retrieved at <<http://ciir.cs.umass.edu/irchallenges/risk.pdf>>, in SIGIR '01: Proceedings of the 24th annual international ACM SIGIR conference on Research and development in information retrieval. New York, NY, USA: ACM, 2001, pp. 111-119.

Lawrence, "Context in Web Search," retrieved at <<http://citeseerx.ist.psu.edu/viewdoc/summary?doi=10.1.1.38.6466>>, IEEE Data Engineering Bulletin, vol. 23, No. 3, (c) 2000. pp. 25-32.

Lowe, "Distinctive Image Features from Scale-Invariant Keypoints," retrieved from <<http://www.cs.ubc.ca/~lowe/papers/ijcv04.pdf>>, International Journal of Computer Vision, vol. 60, No. 2, Jan. 5, 2004, pp. 91-110.

Luo et al., :Integration of Context and Content for Multimedia Management: An Introduction to the Special Issue, retrieved at <<http://ieeexplore.ieee.org/stamp/stamp.jsp?tp=&arnumber=4757434>>, IEEE Transactions on Multimedia, vol. 11, No. 2, Feb. 2009, 3 pages.

Manning et al., "An Introduction to Information Retrieval," 1st ed. Cambridge University Press, Jul. 2008, 581 pages.

Mikolajczyk et al., "Scale & Affine Invariant Interest Point Detectors," retrieved at <<http://www.robots.ox.ac.uk/~vgg/research/affine/det_eval_files/mikolajczyk_ijcv2004.pdf>>, International Journal of Computer Vision, vol. 60, No. 1, (c) 2004, pp. 63-86.

Oliva et al., "The Role of Context in Object Recognition," retrieved at <<http://dx.doi.org/10.1016/j.tics.2007.09.009 >>, Trends in Cognitive Sciences, vol. 11, No. 12, Dec. 2007, pp. 520-527.

Philbin et al., "Object Retrieval with Large Vocabularies and Fast Spatial Matching," retrieved at <<http://www.robots.ox.ac.uk/~vgg/publications/papers/philbin07.pdf>>, in CVPR '07: Proceedings of 2007 IEEE Conference on Computer Vision and Pattern Recognition, Jun. 2007, pp. 1-8.

Philbin et al., "The Oxford Buildings Dataset," retrieved on May 9, 2011 at <<http://www.robots.ox.ac.uk/~vgg/data/oxbuildings/>>, Visual Geometry Group Home Page, 4 pages.

Rabinovich et al., "Objects in Context," retrieved at <<http://citeseerx.ist.psu.edu/viewdoc/download?doi=10.1.1.67.434&rep=rep1&type=pdf>>, in ICCV '07: Proceedings of the 11th IEEE International Conference on Computer Vision, Oct. 2007, pp. 1-8.

Rother et al., "'GrabCut'—Interactive Foreground Extraction using Iterated Graph Cuts," retrieved at <<http://dx.doi.org/10.1145/1015706.1015720 >>, ACM Transactions on Graphics (TOG), vol. 23, No. 3, Aug. 2004, pp. 309-314.

Sinha et al., "Semantics in Digital Photos: A Contextual Analysis," retrieved at <<http://ieeexplore.ieee.org/stamp/stamp.jsp?tp=&arnumber=4597174>>, The IEEE International Conference on Semantic Computing, (c) 2008, 8 pages.

Sivic et al., "Video Google: A Text Retrieval Approach to Object Matching in Videos," retrieved at <<http://www.robots.ox.ac.uk/~vgg/publications/papers/sivic03.pdf>>, in ICCV '03: Proceedings of the Ninth IEEE International Conference on Computer Vision. Washington, DC, USA: IEEE Computer Society, 2003, 8 pages.

Smeulders et al., "Content-based Image Retrieval at the End of the Early Years," retrieved at <<http://ieeexplore.ieee.org/stamp/stamp.jsp?tp=&arnumber=895972>>, IEEE Transactions on Pattern Analysis and Machine Intelligence, vol. 22, No. 12, 2000, pp. 1349-1380.

Snoek et al., "Concept-Based Video Retrieval," retrieved at <<http://www.science.uva.nl/research/publications/2009/SnoekFTIR2009 >>, Foundations and Trends in Information Retrieval, vol. 4, No. 2, 2009, pp. 215-322.

TinEye Reverse Image Search, retrieved on May 9, 2011 at <<http://www.tineye.com/>>, 2 pages.

Torralba et al., "Context-Based Vision System for Place and Object Recognition," retrieved at <<http://citeseerx.ist.psu.edu/viewdoc/download?doi=10.1.1.87.3091&rep=rep1&type=pdf>>, in ICCV '03: Proceedings of the Ninth IEEE International Conference on Computer Vision, Washington, DC, USA, IEEE Computer Society, 2003, p. 273.

Tsotsos et al., "Modeling Visual Attention via Selective Tuning," retrieved at <<http://dx.doi.org/10.1016/0004-3702(95)00025-9 >>, Artificial Intelligence, vol. 78, No. 1-2, Oct. 1995, pp. 507-545.

Wang et al., "Image and Video Matting: A Survey," retrieved at <<http://velho.impa.br/ip08/reading/video-matting.pdf>>, Hanover, MA, USA: Now Publishers Inc., 2007, vol. 3, No. 2, 79 pages.

Welcome to Flickr—Photo Sharing, retrieved on May 9, 2011 at <<http://www.flickr.com>>, 1 page.

Yang et al., "Mobile Image Search with Multimodal Context-aware Queries," retrieved at <<http://lbmedia.ece.ucsb.edu/resources/ref/IWMV10.pdf>>, in International Workshop on Mobile Vision (in conjunction with CVPR 2010), 2010, 8 pages.

Zha et al., "Visual Query Suggestion," retrieved at <<http://staff.science.uva.nl/~cgmsnoek/pub/readinggroup/ZhaVisualQuerySuggestion.pdf>>, in MM '09: Proceedings of the seventeenth ACM International Conference on Multimedia, New York, NY, USA, ACM, 2009, pp. 15-24.

Zhai et al., "A Study of Smoothing Methods for Language Models Applied to Information Retrieval," retrieved at <<http://citeseerx.ist.psu.edu/viewdoc/download?doi=10.1.1.58.8978&rep=rep1&type=pdf>>, ACM Transactions on Information Systems, vol. 22, No. 2, 2004, pp. 179-214.

(56) References Cited

OTHER PUBLICATIONS

Zhai, "Statistical Language Models for Information Retrieval a Critical Review," retrieved at <<http://sifaka.cs.uiuc.edu/czhai/pub/slmir-now.pdf>>, Foundations and Trends (R) in Information Retrieval, vol. 2, No. 3 (2008) 137-213, (c) 2008, 77 pages.

Zhou et al., "Relevance Feedback in Image Retrieval: A Comprehensive Review," retrieved at <<http://press.liacs.nl/students.mir/Relevance%20feedback%20in%20image%20retrieval%20-%20A%20comprehensive%20review.pdf>>, Multimedia Systems, vol. 8, No. 6, pp. 536-544, Apr. 2003, 9 pages.

* cited by examiner

OBJECT RETRIEVAL USING VISUAL QUERY CONTEXT

BACKGROUND

In an object retrieval system, a user may select a query image and specify a region of interest in the query image around the object of interest (referred to as the query object) to specify the search intent. Features may be extracted from the region of interest and quantized into visual words. The visual words representation of the region of interest may be used to identify relevant images.

However, current object retrieval methods may fail to return satisfactory results under certain circumstances. For example, if the region of interest specified by the user is inaccurate or if the object captured in the query image is too small to provide discriminative details, the object retrieval may result in erroneous or few matches with similar objects. In other words, object retrieval based on visual words may not achieve reliable search results where the visual words extracted from the region of interest are unable to reliably reveal the search intent of the user.

A user typically specifies a region of interest using a bounding box, i.e., a rectangle that specifies a portion of the query image. However, the bounding box may be a rough approximation of the region of interest representing the query object. For example, the bounding box may not accurately represent the region of interest because the bounding box may be rectangular while the region of interest may have a complex shape. In this example, the visual words extracted from the bounding box may include information that is unrelated to the search intent. In addition, in cases where the region of interest is too small, or where the query object lacks discriminative details, the number of visual words derived from the bounding box may be insufficient to perform a reliable relevance estimation, with the consequence that irrelevant images may be returned.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations provide techniques and arrangements to perform image retrieval. For example, some implementations identify an object of interest and a visual context in a first image. In some implementations, a second image that includes a second object of interest and a second visual context may be compared to the object of interest and the visual content, respectively, to determine whether the second image matches the first image.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Contextual Object Retrieval

Figure 1:
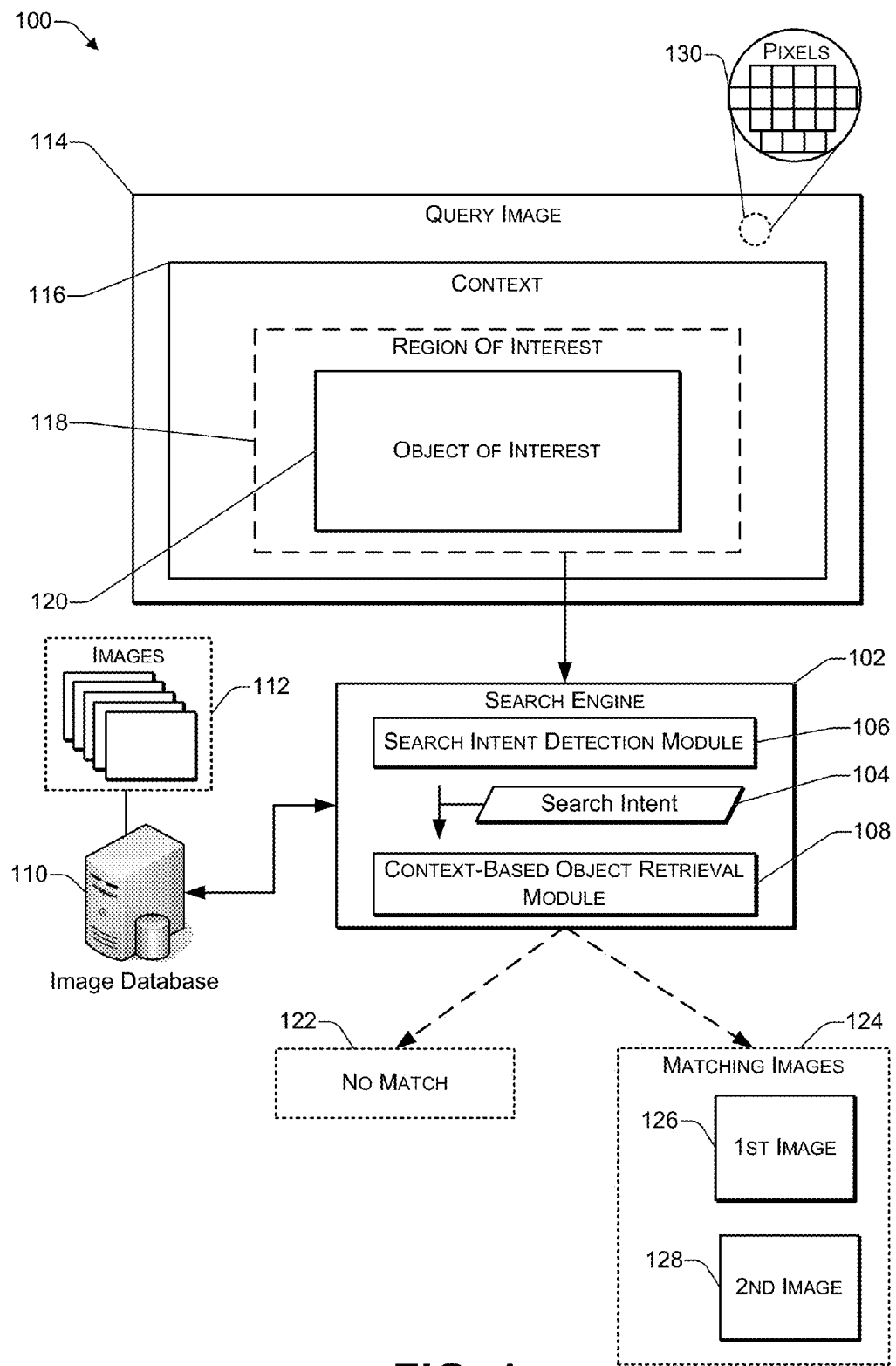
FIG. 1 illustrates an example framework for object retrieval according to some implementations.

Conventional object retrieval methods may fail to return satisfactory results if the region of interest specified by the user is inaccurate or if the object of interest captured in the query image is too small to provide discriminative details. Some implementations herein provide techniques to identify a visual context in the query image. The visual context may be used along with the object of interest to determine a search intent of the user. The search intent may be used to retrieve matching images from an image database.

For example, a visual context of a query object may be used to compensate for possible uncertainty in feature-based query object representation. Contextual information may be drawn from visual elements surrounding the query object in the query image. The region of interest may be regarded as an uncertain observation of the latent search intent. A saliency map detected for the query image may be used as a prior probability distribution (also referred to as a prior). A search intent may be determined based on the uncertain region of interest and the saliency prior. A contextual object retrieval may be performed using a language modeling approach in which words are selected to represent the search intent. The selected words may be compared to words associated with images in an image database to identify matching images.

In some implementations, a framework that provides context-based object retrieval may use a language modeling approach for retrieval. In a conventional object retrieval system visual words associated with the region of interest are used to perform a search. In contrast, some of the implementations described herein may use visual words from both the region of interest and the visual context. The visual words may be weighted using the search intent scores based on the uncertain observation of the search intent (e.g., the region of interest) and the saliency prior derived from a saliency map of the query image.

The technologies described herein generally relate to object retrieval. Some implementations provide techniques to receive a query associated with a query image and determine saliency scores for a plurality of positions in the query image. A prior probability distribution may be determined based on the saliency scores. A search intent may be determined based on the prior probability distribution and the user-specified bounding box. Based on the search intent, some implementations may identify, from a set of images, one or more images that match the query image.

Some instances may receive data identifying a region of interest associated with the query image provided by the user. An object of interest may be identified in the query image based on the region of interest. A visual context associated with the object of interest may be identified, in the query image. The visual context may include a portion of the query image that does not include the object of interest. A comparison between the query and the database image is performed based on the object of interest in query image, as well as the visual context.

Additionally, some implementations may receive a query image automatically determined with contrast-based saliency scores. The contrast-based saliency scores may be used to determine a prior probability distribution. A search intent associated with the query may be determined based on the prior probability distribution. The contextual object retrieval may use visual words selected based on the search intent.

Object Retrieval Framework

FIG. 1 illustrates an example framework 100 for object retrieval according to some implementations. The framework 100 may be executed by a computing device or other particular machine specifically configured with processor-executable instructions, as discussed additionally below.

The framework 100 includes a search engine 102 communicatively coupled to an image database 110. In some implementations, the search engine 102 may execute at a first computing device (not shown) and the image database may execute at a second computing device (not shown). In other implementations, the search engine 102 and the image database may both execute at the same computing device (not shown). The image database 110 may include one or more images 112. The search engine 102 includes a search intent detection module 106 and a context-based object retrieval module 108.

The search intent detection module 106 may determine a search intent 104 from an image, such as the query image 114, that is received as input at the search engine 102. The context-based object retrieval module may perform a search of the image database 110 based on the search intent 104 to determine whether any images 112 in the image database 110 match the query image 114.

For example, the search engine 102 may receive a search query that includes the query image 114. The query image 114 include multiple pixels 130. The query image 114 may include a region of interest 118 that identifies at least a portion of the query image 114. The region of interest 118 may be specified by a user. The region of interest 118 may include an object of interest 120. Conventional object retrieval techniques may directly compare the region of interest 118 with images 112 in the image database 110, without regard to a context 116 associated with the object of interest 120. For example, even though one or more of the other image(s) in the image database 110 may include the object of interest 120, conventional object retrieval techniques may not recognize a match when the region of interest 118 is inaccurate (e.g., does not include all of the object of interest) or when the object captured in the query image is too small to provide discriminative details.

In order to address these issues, the search intent detection module 106 may determine the search intent 104 from the context 116 or from a combination of the context 116 and the object of interest 120. The context 116 may be a portion of the query image 114 that includes the object of interest 120. The context 116 may be a portion of the query image 114 that is larger than the region of interest 118. For example, the object of interest 120 may be a building that is located near distinctive features, such as large trees or a mountain. The distinctive features may appear in the context 116 but not in the region of interest 118. The search intent detection module 106 may determine the search intent 104 based on both the context 116 and the object of interest 120.

The context-based object retrieval module 108 may perform a search of the image database 110 based on the search intent 104 to determine whether any images 112 in the image database 110 match the query image 114. The search engine 102 may provide as output one or more matching images 124 when the search identifies matching images (e.g., a first image 126 and a second image 128) from the images 112 that match the search intent 104. The first image 126 and the second image 128 may include at least a portion of the object of interest 120, at least a portion of the context 116, or any combination thereof. The search engine 102 may indicate that no match 122 was found when the search does not identify any of the images 112 in the image database 152 as matching the search intent 104.

Thus, the search intent detection module 106 may use the context 116 in addition to or instead of the object of interest 120 to determine the search intent 104. The context-based object retrieval module 108 may use the search intent to perform a search of the image database 110 to identify matching images 126 and 128. By including the context 116 when determining the search intent 104, the search engine 102 may identify the matching images 126 and 128 when the region of interest 118 is inaccurate (e.g., does not include all of the object of interest) or when the object captured in the query image is too small to provide discriminative details.

Region of Interest

Some implementations may return a ranked list of relevant images (e.g., the images 126 and 128) in response to a query. In mathematical terms, some implementations may determine a relevance of an image d in a database with respect to a query $q=\{q^I, q^b\}$, where $q^I$ represents the image and $q^b=[x_l, y_l, x_r, y_r]$ identifies the region of interest. In this example, a rectangular bounding box is used to specify the region of interest, with $(x_l, y_l)$ and $(x_r, y_r)$ representing the coordinates of the top left and bottom right point of the rectangle, respectively.

For ease of understanding, a rectangular bounding box and corresponding coordinates are used example herein. However, other geometric shapes, such as a triangle, circle, or the like may be used to identify the region of interest. For example, $q^b=[x_1, y_1, x_2, y_2, \text{and } x_3, y_3]$ may be used to represent a triangular shaped region of interest, with $(x_1, y_1)$, $(x_2, y_2)$, and $(x_3, y_3)$ identifying coordinates of three vertices of the triangle. As another example, $q^b=[x_1, y_1, r]$ may be used to represent a circular shaped region of interest, with $(x_1, y_1)$ identifying coordinates of a center of the circle and r identifying a radius of the circle. In some implementations, a free-form shape may be used to identify the region of interest. For example, $q^b=[x_1, y_1, l_1, x_2, y_2, l_2, \ldots x_n, y_n, l_n]$ may be used to represent a free-form shaped region of interest (where n>2). In this example, $(x_1, y_1, l_1), (x_2, y_2, l_2), \ldots (x_n, y_n, l_n)$ identify multiple lines that make up the free-form shape. For example, the multiple lines may include a line that starts at coordinates $(x_1, y_1)$, ends at coordinates $(x_2, y_2)$ and has a length of $l_1$. The tuple $(x_n, y_n, l_n)$ may identify a line that starts at coordinates $(x_n, y_n)$, ends at coordinates $(x_1, y_1)$ and has a length of $l_n$.

Language Model Based Query Representation

In a context-based retrieval framework, image retrieval may be performed using visual words to represent the search intent 104. To perform language model based queries using visual words, the query image 114 and the images 112 in the image database 110 may each be represented as one or more visual words. To identify visual words to represent a particular image, interest points may be detected in the particular image based on techniques such as Difference of Gaussian (DoG) or Harris Affine detectors. For each of the detected interest points, Scale Invariant Feature Transform (SIFT) descriptors may be extracted to represent a local region around each interest point. The SIFT descriptors may be quantized into visual words using a K-means vector quantization method. This may result in the query image being represented as $q^I=[(q_i,p_i)]_{i=1}^{M_q}$. The images 112 in the image database 110 (sometimes referred to as documents) may be represented as $d=[d_i]_{i=1}^{M_d}$, where $q_i$ and $d_i$ represent the extracted visual words from the query and a document, respectively, $p_i$ represents the corresponding position of a visual word in an image, and $M_q$ and $M_d$ represent a numbers of visual words in the query image 114 and the images 112, respectively. Herein, the term $w_i$ may identify a specific visual word associated with a particular image I and the term w may identify multiple visual words associated with a particular image.

Language Model Based Retrieval Model

After the query image 114 and the images 112 in the image database 110 are represented as sets of visual words, a language model based retrieval model may be used to perform a search. In the language model based retrieval model, a language model, such as a unigram model p(w|d), may be estimated for words w for each of the images 112 (referred to as documents) d in the image database 110. The relevance between a query and a document may be estimated as the query likelihood given the document d and may be written as:

$$p(q|d) = \prod_{i=1}^{M_q} p(q_i|d). \quad (1)$$

A language model based retrieval model may be considered a risk minimization problem in which the risk of returning a document d given the query q may be defined as:

$$R(d;q) = R(a=d|q,C) \quad (2)$$
$$= \sum_{r\in\{0,1\}} \int_{\theta_Q}\int_{\theta_D} L(\theta_Q, \theta_D, r) \times p(\theta_Q|q)$$
$$p(\theta_D|d)p(r|\theta_Q, \theta_D)d\theta_Q\,d\theta_D,$$

where a=d is the action to return the document d for the query q, C is the collection of documents in the database, r indicates the relevance of the document d to the query q, and where $\theta_Q$ and $\theta_D$ are the language models for the query model and the document model, respectively. In the above equation, L represents a loss function, which may be modeled using a Kullback-Leibler (KL) divergence between the query model and the document model. The divergence may be used estimate the loss function resulting in the following risk function:

$$R(d;q) \propto -\sum_{w_i} p(w_i|\hat{\theta}_Q)\log p(w_i|\hat{\theta}_D) + \xi_q, \quad (3)$$

where $$\hat{\theta}_Q = \arg\max_{\theta_Q} p(\theta_Q|q) \quad (4)$$
$$\hat{\theta}_D = \arg\max_{\theta_D} p(\theta_D|d)$$

are the maximum a posteriori estimations of the query model and the document model. The term $\xi_q$ is a query-dependent constant and may be ignored when equation (3) is used to rank the resulting documents (e.g., the matching images 124) for a particular query. The probability of words may be estimated using a maximum-likelihood criterion:

$$p_{ml}(p_i|\hat{\theta}_Q) = \frac{c_i(q)}{M_q} \quad (5)$$
$$p_{ml}(d_i|\hat{\theta}_D) = \frac{c_i(d)}{M_d},$$

where $c_i(q)$ and $c_i(d)$ are the term frequencies of the words $q_i$ and $d_i$ in the query and a document, respectively.

In an empirical estimation of a document model, a probability of visual words which do not occur in a document may be zero, resulting in infinite numbers in the relevance estimation based on the divergence in equation (3). To address this, a smoothing function may be used. For example, a smoothing function that incorporates linear interpolation of a maximum likelihood estimation of a language model and a collection model, such as Jelinek-Mercer smoothing, may be performed. The smoothing may be formulated as:

$$p_\lambda(w_i|\hat{\theta}_D)=(1-\lambda)p_{ml}(w_i|\hat{\theta}_D)+\lambda p(w_i|C), \quad (6)$$

where $p(w_i|C)$ is the collection language model and $\lambda\in[0,1]$ is the trade-off parameter to control the contribution of the smoothing term.

Context-Based Object Retrieval

As discussed above, conventional object retrieval systems use only visual words that represent the region of interest 118 to estimate the query model. However, in a context-based object retrieval framework, the visual context may be used to improve the reliability of this estimation by looking beyond information available in the region of interest 118. A divergence retrieval model may be used to estimate the relevance between the query and database images using a context-aware query model.

The query image 114 with the region of interest 118 may be generated from the following distribution:

$$p(q|\theta_Q) = p(q^I, q^b|\theta_Q) \propto \prod_{i=1}^{M_q} p(q_i, p_i|\theta_Q), \quad (7)$$

with $$p(q_i, p_i|\theta_Q) = p(q_i|\theta_Q)^{S(p_i,q)}, \quad (8)$$

where $S(p_i,q)$ is the search intent score of the visual word $q_i$ at the position $p_i$. A context-based object retrieval framework may include both visual words associated with the region of interest 118 and visual words associated with the context 116. The search intent score may indicate a confidence that a particular visual word is relevant to the search intent. In contrast, a conventional object retrieval system that does not consider the context 116 has a binary search intent score, where visual words associated with the region of interest have a search intent score of 1, and visual words outside the region of interest have a search intent score of 0.

Based on the distribution represented by equation (7), a maximum likelihood estimation of the context-aware query model $\theta_Q$ may be expressed as:

$$p(w_j | \theta_Q) = \frac{\sum_{i=1}^{M_q} S(p_i, q)\delta(q_i = w_j)}{\sum_{i=1}^{M_q} S(p_i, q)}, \quad (9)$$

Equation (9) may be integrated into the retrieval model represented by equation (3) to rank the images.

Search Intent Score Estimation

The search intent score of each visual word associated with the query image 114 may be proportional to a probability of a corresponding position of that visual word to reflect a search intent of a user given the query image 114 and the region of interest 118:

$$S(p_i, q) \propto p(p_i | q). \quad (10)$$

Assuming a uniform prior, the probability represented by equation (10) may be proportional to a likelihood of generating the query image 114 and the region of interest 118 given the search intent score:

$$p(p_i|q) = p(p_i|q^I, q^b)$$

$$\propto p(q^I, q^b | p_i). \quad (11)$$

Assuming that the region of interest 118 and the query image 114 are conditionally independent given the search intent score per position:

$$p(p_i|q) \propto p(q^b|p_i) p(q^I|p_i). \quad (12)$$

Equation (12) may be represented as:

$$p(p_i|q) \propto p(p_i|q^b) p(p_i|q^I). \quad (13)$$

In equation (13), the first term, $p(p_i|q^b)$ represents the probability that the position $p_i$ reflects a search intent determined from the region of interest 118. The second term, $p(p_i|q^I)$, represents the probability that the position $p_i$ represents salient properties of the query image 114, indicating a logical choice of a prior for inferring a user's search intent given a search session. As such, the second term in equation (13) may be estimated using saliency detection and may be used to improve the reliability of the search intent score estimation, particular when information provided by the region of interest 118 is unreliable. For example, the information provided by the region of interest 118 may be unreliable if the region of interest 118 is inaccurate or if the object of interest 120 in the query image 114 is too small to provide discriminative details.

Saliency Detection

Saliency detection may be used in content-based image retrieval to detect potentially important and representative regions in the query image 114. For example, saliency detection may be used to determine the prior for defining the region of interest 118 in the query image 114. In some implementations, contrast-based saliency detection may be used because color contrast plays an important part in attracting human attention when an image is viewed. A contrast-based saliency score may be determined for each of the positions in an image using the following equation:

$$C_i = \sum_{y \in N_i} d(l(p_i), l(y)), \quad (14)$$

where $N_i$ is the neighborhood of the position $p_i$ in the image, and $l(p_i)$ and $l(y)$ are the color values in the positions $p_i$ and y, and d is the Gaussian distance between the color values. In some implementations, the colors may be chosen from an LUV space. The contrast-based saliency score of equation (14) may be normalized into the range [0,1], resulting in a saliency score $A_i$ for each of the positions in an image. The contrast-based saliency score of equation (14) may be transformed into the prior probability using the equation:

$$p(p_i|q^I) \propto \exp(-\gamma(A_i - 1)^2), \quad (15)$$

where $\gamma$ is the inverse of color temperature.

Determining Search Intent

Search intent may be determined using various techniques, such as spatial propagation or appearance propagation. When determining the search intent using spatial propagation, a dual sigmoid approximation that considers spatial proximity of pixels in an image may be used.

Dual-Sigmoid Approximation

Figure 2:
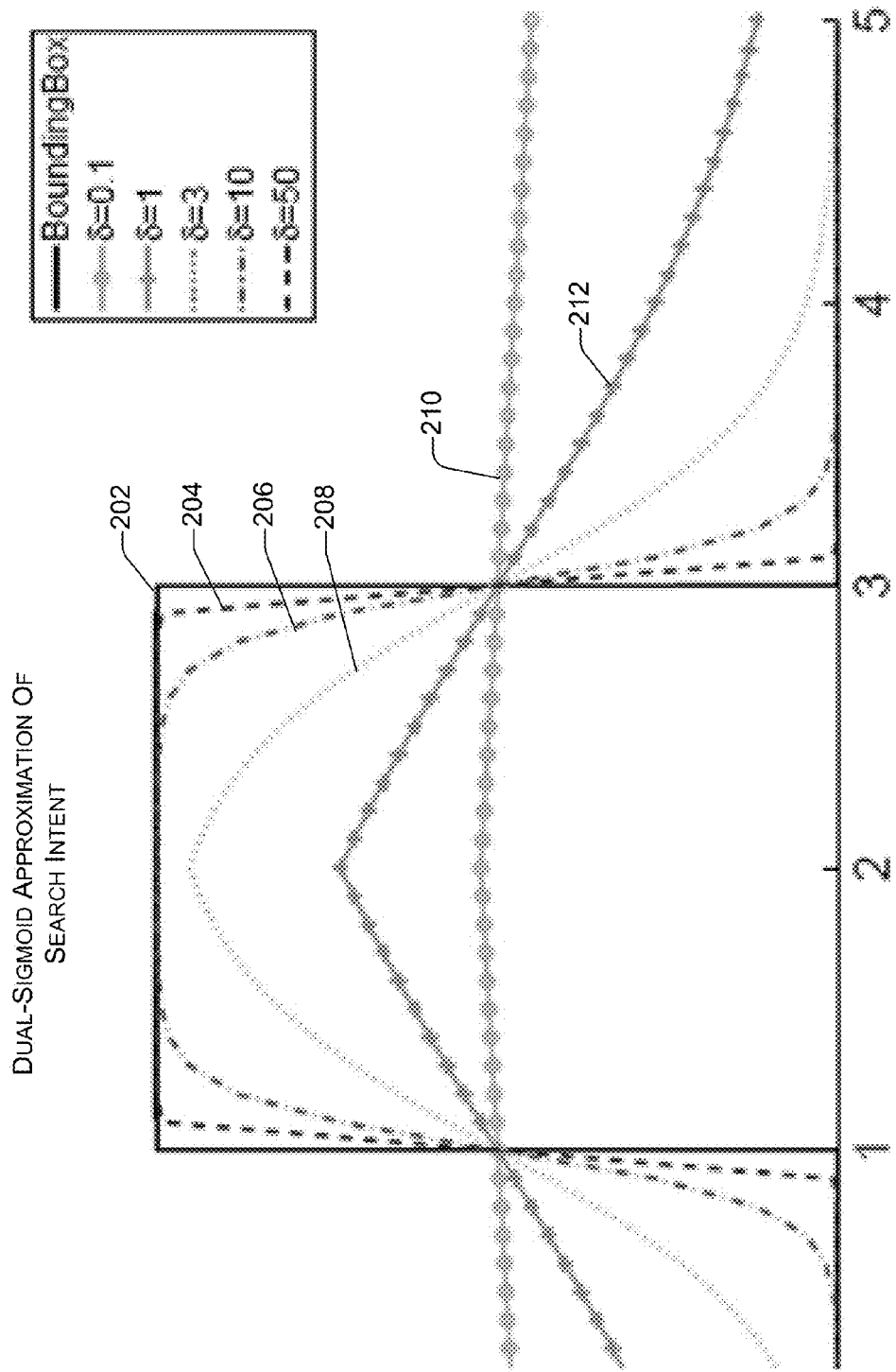
FIG. 2 illustrates examples of dual-sigmoid approximations of search intent according to some implementations.

FIG. 2 illustrates examples of dual-sigmoid approximations of the search intent 104 according to some implementations. For example, the search intent detection module 106 may determine the search intent using a dual-sigmoid approximation.

The region of interest 118 that is specified by a user may be rough and inaccurate for a variety of reasons. For example, the user may be in a hurry and not take the time to accurately specify the region of interest 118. As another example, the user may be unfamiliar with what constitutes an accurate region of interest. In addition, a query interface that enables a user to specify the region of interest 118 via a geometric shape, such as a rectangle, may not accurately represent a complex region of interest. For example, a rectangular shaped region of interest may not accurately represent a building with architectural features such as towers or spires.

When estimating the search intent 104 based on information from the region of interest 118, assume that the intents for the two dimensions of the image are independent of each other so that the intent probability can be decomposed into the product of the probabilities estimated from the two dimensions respectively:

$$p(p_i | q^b) = p(x_i, y_i | x_l, y_l, x_r, y_r) \quad (16)$$
$$= f(x_i; x_l, x_r, \delta) f(y_i; y_l, y_r, \delta).$$

The function $f$, i.e., the search intent score estimation of a single dimension, may be a smoothed approximation of the region of interest 118 along the single dimension to take into account the uncertainty and the context 116. In other words, the value of $f$ for $x_l < x_i < x_r$ may be close to 1 and may be approaching 0 the further $x_i$ is from the region of interest 118. In this example, for ease of understanding, the region of interest 118 is assumed to be a rectangular shape, referred to as a bounding box. To obtain a probability distribution, the function $f$ may be modeled as the minimization of two sigmoid functions for the two sides of the bounding box along each dimension. For the x-dimension this model may be defined as:

$$f(x_i; x_l, x_r, \delta) = \min\left(\frac{1}{1 + \exp(\delta(x_l - x_i))}, \frac{1}{1 + \exp(\delta(x_i - x_r))}\right), \quad (17)$$

where δ is a parameter serving as a tradeoff between fitting the bounding box and being sufficiently smooth to incorporate the context. The same model for $f$ may also be used for the y-dimension.

FIG. 2 illustrates the dual sigmoid function of equation (17) for different values of δ. In FIG. 2, the bounding box is represented by graph 202. Graph 204 illustrates the dual-sigmoid approximation when δ=50, graph 206 illustrates the dual-sigmoid approximation when δ=10, graph 208 illustrates the dual-sigmoid approximation when δ=3, graph 210 illustrates the dual-sigmoid approximation when δ=1, and graph 212 illustrates the dual-sigmoid approximation when δ=0.1. As illustrated in FIG. 2, the dual sigmoid function approximates the bounding box, with the accuracy of the approximation increasing as δ increases (e.g., as δ→+∞, the function $f$ approaches the bounding box specification). As δ decreases, more smoothing may occur, which means that the bounding box specification may be more uncertain and the context information may have a greater effect on the accuracy of the search intent. In the extreme case of δ=0, the bounding box specification may be discarded and the entire query image 114 may be used to determine the search intent 104.

The search intent score may be determined by multiplying the prior, represented in equation 15, with the probability estimation indicating the search intent 104 based on the bounding box specification:

$$S_a(p_i,q)\exp(-\gamma(A_i-1)^2) \times f(x_i;x_b,x_r,\delta) f(y_i;y_b,y_r,\delta). \quad (18)$$

The parameters γ and δ determine the contributions from the prior and the bounding box, respectively, to the intent score estimation. For example, when the bounding box specification is reliable then a smaller γ and a larger δ may be used and when the bounding box specification is unreliable, a larger γ and a smaller δ may be used.

Estimating Search Intent from the Bounding Box by Matting

The search intent 104 is estimated from the bounding box (e.g., the region of interest 104) to assign high scores to the object of interest 120, which is typically in the foreground. Lower scores may be assigned to the background or other foreground objects that are not of interest to the user, but that are regarded as a useful context for image retrieval based on the region of interest 118. This is similar to image matting, in which the foreground is separated from the background by estimating alpha values (values in the alpha channel indicate opacity) for each pixel. In some implementations, an image matting algorithm may be used to estimate the search intent 104 from the bounding box.

Because the bounding box is a rough specification of the object of interest 120, the bounding box may be regarded as containing the object of interest 120 along with other portions of the query image 114. As a result of their proximity to the object of interest, these other portions of the query image 114 are more likely to include background (e.g., contextual) information rather than foreground-related information.

The following approach may be used to determine which portions of the bounding box to categorize as foreground and which portions of the bounding box to categorize as background. Based on the bounding box specification, the image may be segmented to estimate a foreground model and a background model. The estimated foreground and background models may be used to categorize the pixels 130 as foreground pixels or background pixels. The search intent score of each individual pixel may be estimated based on the categorized pixels.

The image may be segmented to estimate a foreground model and a background model using a segmentation algorithm, such as a GrabCut algorithm (an iterative energy minimization algorithm), in which the foreground and background models may be Gaussian Mixture Models (GMM) in a Red-Green-Blue (RGB) color space. The segmentation algorithm may be used to minimize an energy function that includes both a data fitting term and a smoothness term, as defined by the following equation:

$$E(\alpha,k,\theta,z) = U(\alpha,k,\theta,z) + \gamma V(\alpha,z), \quad (19)$$

In equation (19), $\alpha \in \{F,B\}$ indicates whether the pixels 130 belong to the foreground or background, and k indicates which GMM is assigned. Furthermore, θ are the model parameters, z represents the color of each pixel, and γ is the parameter regulating the trade-off between data fitting and smoothing. Specifically, the data fitting term U and the smoothness term V may be defined respectively as follows:

$$U(\alpha, k, \theta, z) = \sum_n -\log \pi(\alpha_n, k_n) + \frac{1}{2} \log |\Sigma(\alpha_n, k_n)| + \quad (20)$$

$$\frac{1}{2}[z_n - \mu(\alpha_n, k_n)]^T \Sigma(\alpha_n, k_n)^{-1} [z_n - \mu(\alpha_n, k_n)],$$

and $$V(\alpha, z) = \sum_{(m,n) \in C} [\alpha_m \neq \alpha_n] \exp(-\beta \|z_m - z_n\|^2) \quad (21)$$

where μ and Σ are the parameters of the foreground and background models, where is the set of pairs of neighboring pixels, and where β is the parameter to adjust the extent of smoothness in a coherent region.

The estimated foreground and background models may be used to determine the probabilities that each pixel belongs to the foreground and to the background, respectively. The probability that a particular pixel of the query image 114 belongs to the foreground may be expressed as:

$$P_F(x) = \frac{P(x \mid \theta, F)}{P(x \mid \theta, F) + P(x \mid \theta, B)}. \quad (22)$$

Using the estimated probabilities as the search intent scores may not take into account spatial smoothness and therefore may not perform accurately. To account for spatial smoothness, the intent scores may be determined based on a portion of the pixels 130 that have been categorized as foreground pixels or background pixels. For example, the top 10% of the pixels inside the bounding box that have the largest foreground probabilities (referred to as $\Omega_F$) and the top 20% of the pixels outside the bounding box that have the largest background probabilities (referred to as $\Omega_B$) may be used as input to a matting algorithm. For example, a matting algorithm based on geodesic distance may be used, as defined by the following equation:

$$D_l(x) = \min_{s \in \Omega_l} d(s, x), \quad (23)$$

where $l \in \{F,B\}$ and where d(s,x) is computed as follows:

$$d(s, x) = \min_{C_{s_1,s_2}} \int_0^1 |W \cdot P_{s_1,s_2}(p)| dp, \quad (24)$$

where $P_{s_1,s_2}$ is any path connecting the two pixels $s_1$ and $s_2$; $W = \nabla P_F(x)$.

Based on the above, the search intent score 104 may determined from the bounding box (e.g., the region of interest 118) using matting and the prior as follows:

$$S_m(p_i, q) \exp(-\gamma(A_i - 1)^2) \times \frac{D_B(x_i)}{D_F(x_i) + D_B(x_i)}, \quad (25)$$

where $\gamma$ controls the contribution from the prior and $x_i$ is the pixel value in the position $p_i$.

Thus, some implementations of a context-based object retrieval framework may use the query language model of equation (9), the search intent score estimated by equation (18) and equation (25) and the divergence retrieval model of equation (3). The inclusion of the visual context 116 may improve the accuracy of an image search engine in various search intent categories, including landmarks, animals, logos, book covers, and paintings. For example, image searches for a particular landmark that take into account the visual context 116 may have a higher accuracy than image searches that do not take into account the visual context 116 because landmarks are usually in a fixed geographical location with adjacent contextual landmarks. As another example, a panda bear may often be found in close proximity to bamboos so taking into account bamboos in the context of an image of a panda bear may assist in distinguishing pictures of a panda bear from pictures of other types of bears during an image search. As a further example, paintings are typically associated with a particular frame. Distinctive features of the frame may be part of a context that assists in distinguishing a particular painting from other paintings during an image search.

Example Architectures

Figure 3:
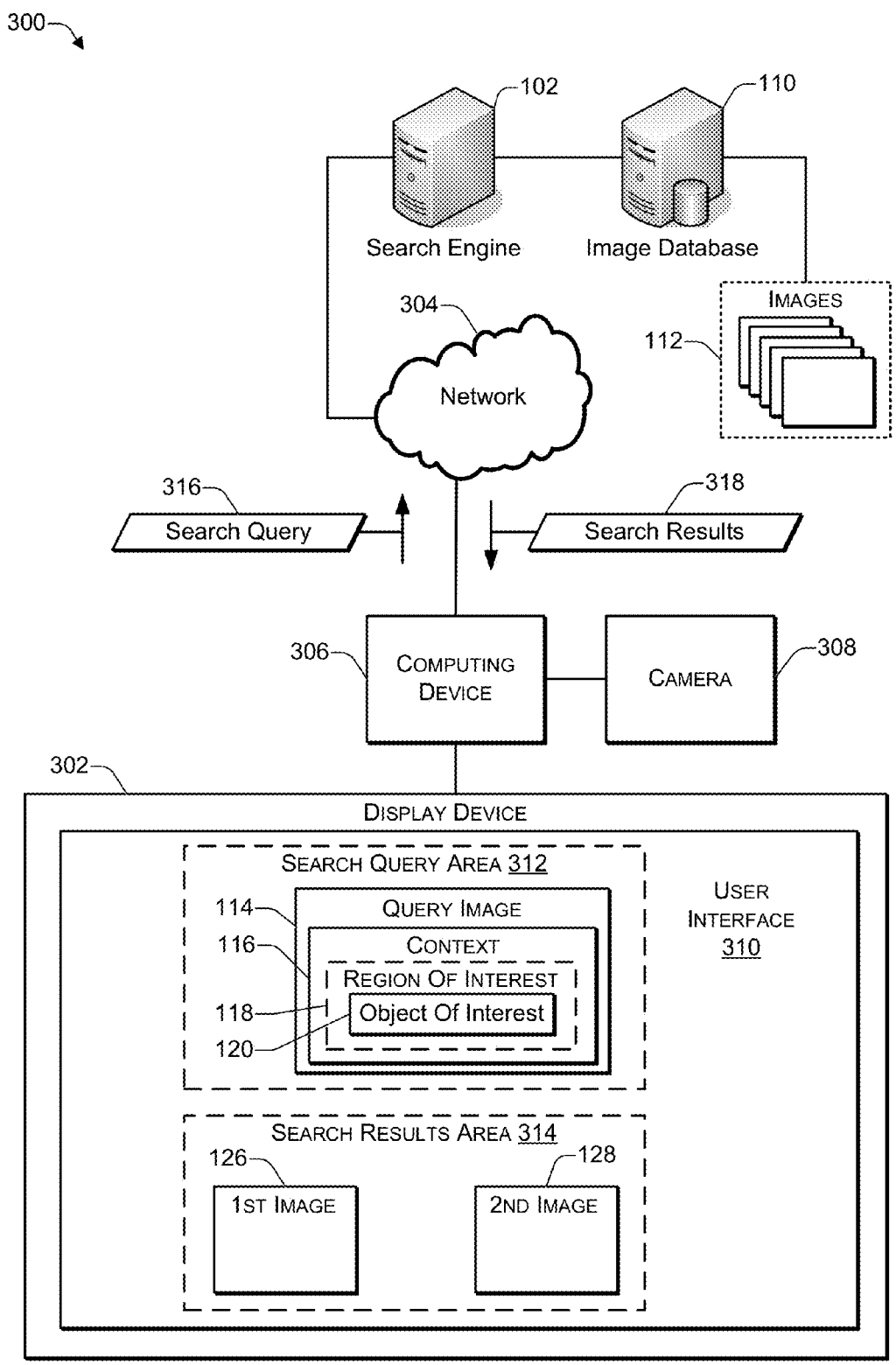
FIG. 3 illustrates an example framework for object retrieval according to some implementations.

FIG. 3 is a block diagram of an example architecture 300 including the search engine 102 according to some implementations herein. In the illustrated example, the search engine 102 may be executed according to the framework 100 and may use the dual-sigmoid approximations of search intent of FIG. 2, as described above. For example, the search engine 102 may include a plurality of computer-readable, processor-executable instructions and modules that may be executable by one or more processors to form a particular machine for attaining the frameworks, processes and functions described herein.

The architecture 300 may include a computing device 306 coupled to the search engine 102 via a network 304. The computing device 306 may be coupled to a display device 302. A camera 308 may be coupled to the computing device 306. For example, the camera 308 may be coupled to the computing device 306 via a Universal Serial Bus (USB) interface or via a wireless interface, such as 802.11 b/g/n, Bluetooth®, or wireless USB. In some implementations, one or more of the camera 308 and the display device 302 may be integrated into the computing device 306. For example, the computing device 306 may be a wireless communication device (e.g., a mobile phone), a tablet device, or laptop computer with an integrated camera and display.

The display device 302 may display a user interface 310 that is provided by the computing device. The user interface 310 may include a search query area 312 and a search results area 314. The search query area 312 may enable a user to select the query image 114. For example, the user may retrieve the query image 114 from the computing device 306 or from the camera 308. The search query area 312 may enable the user to specify the region of interest 118.

The search engine 102 may be coupled to the image database 110 that includes the images 112. The search engine 102 may use a context-based object retrieval framework to perform image retrieval.

In operation, the user may select the query image 114 and specify the region of interest 118. For illustration purposes, a rectangular-shaped bounding box is used to specify the region of interest 118. However, the region of interest 118 may be specified using other shapes, such as a geometric shape (e.g., a triangle, a circle, a rhombus, or a trapezoid), or a free form shape. The search query area 312 of the user interface 310 may enable the user to send a search query 316 to the search engine 102. The search query 316 may include the first image or include data (e.g., an address or a pointer) that enables the search engine to access the query image 114. The search query 316 may also include data specifying the region of interest 118.

In response to receiving the search query 316, the search engine 102 may perform a context-based search of the image database 110 to determine if any of the images 112 matches the query image 114. For example, the search engine 102 may determine contrast-based saliency scores for at least some of the pixels 130 in the query image 114. The contrast-based saliency scores may be normalized. The search engine 102 may determine a prior probability distribution based on the contrast-based saliency scores. The search engine 102 may determine a search intent based on the prior probability distribution via a dual-sigmoid approximation. The search intent may be used to identify visual words associated with the query image 114. Based on the search intent, the search engine 102 may identify one or more images, such as the first image 126 and the second image 128 from the images 112. The images 126 and 128 may be identified by comparing the visual words associated with the query image 114 to visual words associated with each of the images 112. The search engine 102 may send search results 318 to the computing device 306. The computing device 306 may receive the search results 318 from the search engine 102 and display the images 126 and 128 in the search result area 314 of the user interface 310.

Thus, the search engine 102 may use a context-based image retrieval framework to perform a search of the image database 110 to identify one or more images 126 and 128 that match the query image 114. To perform the search, the search engine 102 may determine a search intent of the user based on the context 116 and the region of interest 118. By including the context 116 when determining the search intent, the search engine 102 may provide more accurate results than a conventional system that does not include the context 116 when determining the search intent.

Figure 4:
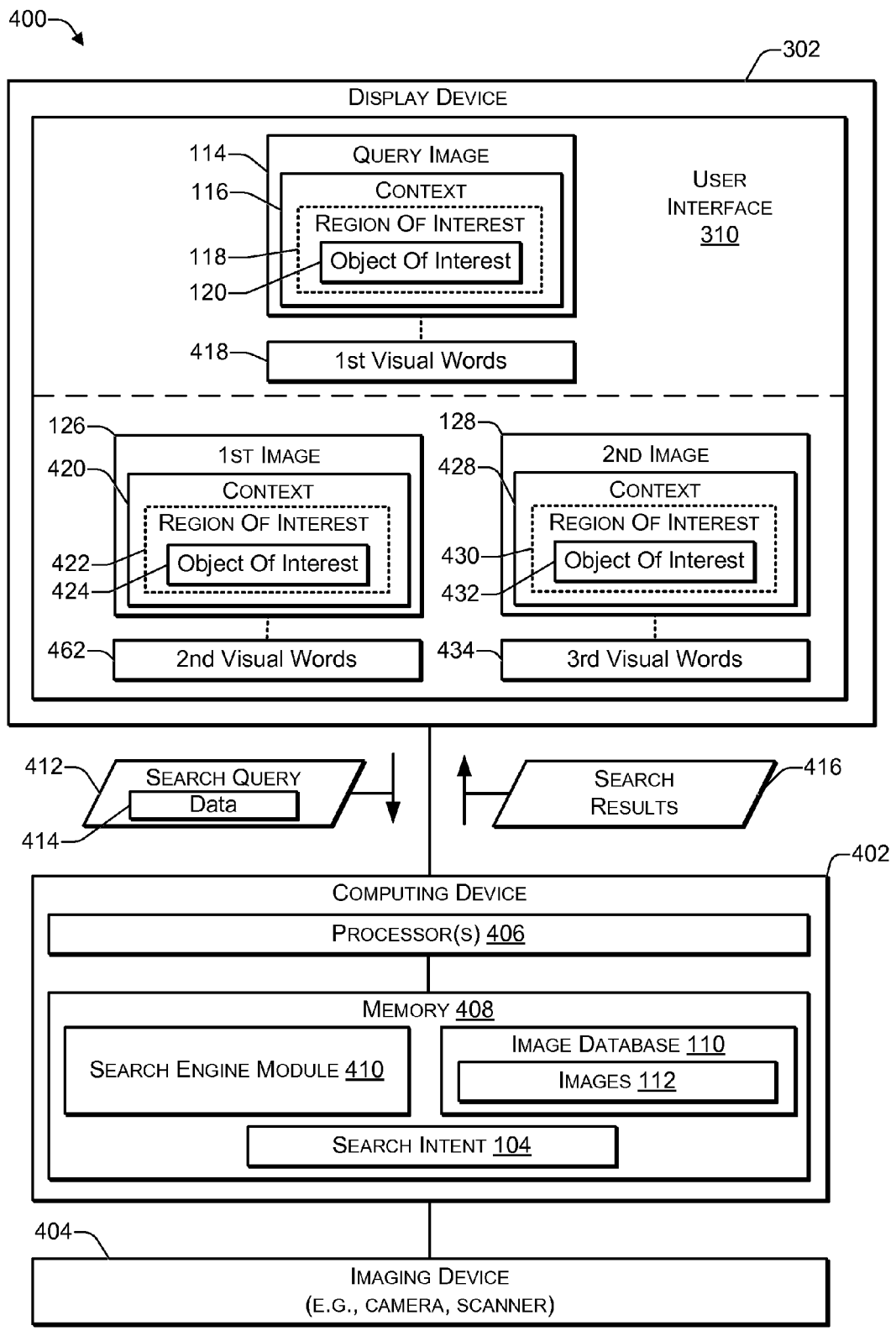
FIG. 4 illustrates an example framework for object retrieval according to some implementations.

FIG. 4 is a block diagram of an example architecture 400 including a search engine module 410 according to some implementations herein. In the illustrated example, the search engine module 410 may execute according to the framework 100 and may use the dual-sigmoid approximations of search intent of FIG. 2, as described above.

The architecture 400 may include a computing device 402 coupled to a display device 302 and to an imaging device 404. The imaging device 404 may be capable of generating an image. For example, the imaging device 404 may be a camera or a scanner. In some implementations, the imaging device 404 may be coupled to the computing device 402 via a Universal Serial Bus (USB) interface or via a wireless interface, such as 802.11 b/g/n, Bluetooth®, or wireless USB. In some implementations, the imaging device 404 and the display device 302 may be integrated into the computing device 402. For example, the computing device 402 may be a wireless communication device (e.g., a mobile phone), a tablet device, or laptop computer with an integrated camera and display. The display device 302 may display the user interface 310 that is provided by the computing device 402.

The computing device 402 may include one or more processors 406 and a memory 408. The memory 408 may include the search engine module 410 and an image database 110. The search engine module 410 may include instructions that are executable by the one or more processors 406. In some implementations, the search engine module 410 may be a software application that is installed in the memory 408. In some implementations, the search engine module 410 may be part of an operating system executing in the memory 408.

In operation, a user may select the query image 114 from the image database 110 or retrieve the query image 114 from the imaging device 404. The user may specify the region of interest 118. The user interface 310 may enable the user to send a search query 412 to the search engine module 410 that is executing on the computing device 402. The search query 412 may include data 414 identifying the region of interest 118. The data 414 may also include the query image 114 or include an address that enables the search engine to access the query image 114.

In response to receiving the search query 412, the search engine module 410 may perform a context-based search of the image database 110 to determine if any of the images in the image database 110 matches the query image 114. For example, the search engine module 410 may determine a search intent of the user based on the region of interest 118 and the context 116. The search intent may be used to identify first visual words 418 associated with the query image 114. The search engine 102 may identify one or more images, such as the first image 126 and the second image 128, from the image database 110. The images 126 and 128 may be identified by comparing the visual words 418 associated with the query image 114 to visual words 426 associated with the first image 126 and with visual words 434 associated with the second image 128.

The search engine module 410 may determine that the second image 442 matches the first image 422 if a number or a percentage of the first visual words 418 that match the second visual words 426 satisfies a threshold. For example, the search engine module 410 may determine that the second image 442 matches the first image 422 if at least eighty-percent of the second visual words 426 match the first visual words 418.

In some implementations, before receiving the search query 412, the search engine module 410 may pre-process images in the image database 110 by selecting visual words for each image in the image database 110. For example, during the pre-processing, the search engine module 410 may select the second visual words 426 for the first image 126 based on one or more of a region of interest 422, a context 420, and an object of interest 424. The search engine module 410 may select the third visual words 434 for the second image 128 based on one or more of a region of interest 430, a context 428, and an object of interest 432. After selecting visual words for each image in the image database 110, the search engine module 410 may store the selected visual words in the image database 110 so that each image in the image database 110 has an associated set of visual words.

In some implementations, each time an image is added to the image database 110, the search engine module 410 may automatically (e.g., without human interaction) pre-process the added image by selecting visual words and storing the selected visual words in association with the added image. In some implementations, the search engine module 410 may periodically and automatically (e.g., without human interaction) pre-process newly added images. For example, the search module 414 may initially pre-process images in the image database 110 at a first date. At a second date that occurs after the first date, the search module 414 may pre-process new images that have been added to the image database 110 since the first date. The interval between the first date and the second date may be user selectable. For example, the user may specify that the search module 414 pre-process newly added images every week, every month, every three months, etc. In some implementations, a user may selectively override the automatic pre-processing. For example, the user may instruct the search engine module 410 to initiate pre-processing of newly added images.

After performing the search in response to the search query 412, the search engine 102 may send search results 416 to the display device 302. When the search results 416 include the images 126 and 128, the display device 302 may display the images 126 and 128 in the user interface 310.

Thus, the search engine 102 may determine a search intent of the user based on the context 116 and the region of interest 118 of the query image 114. The search engine module 410 may use a context-based image retrieval framework to perform a search of the image database 110 to identify one or more images 126 and 128 that match the query image 114 based on the search intent. Including the context 116 when determining the search intent may result in more accurate results than a conventional system that does not include the context 116 when determining search intent.

Figure 5:
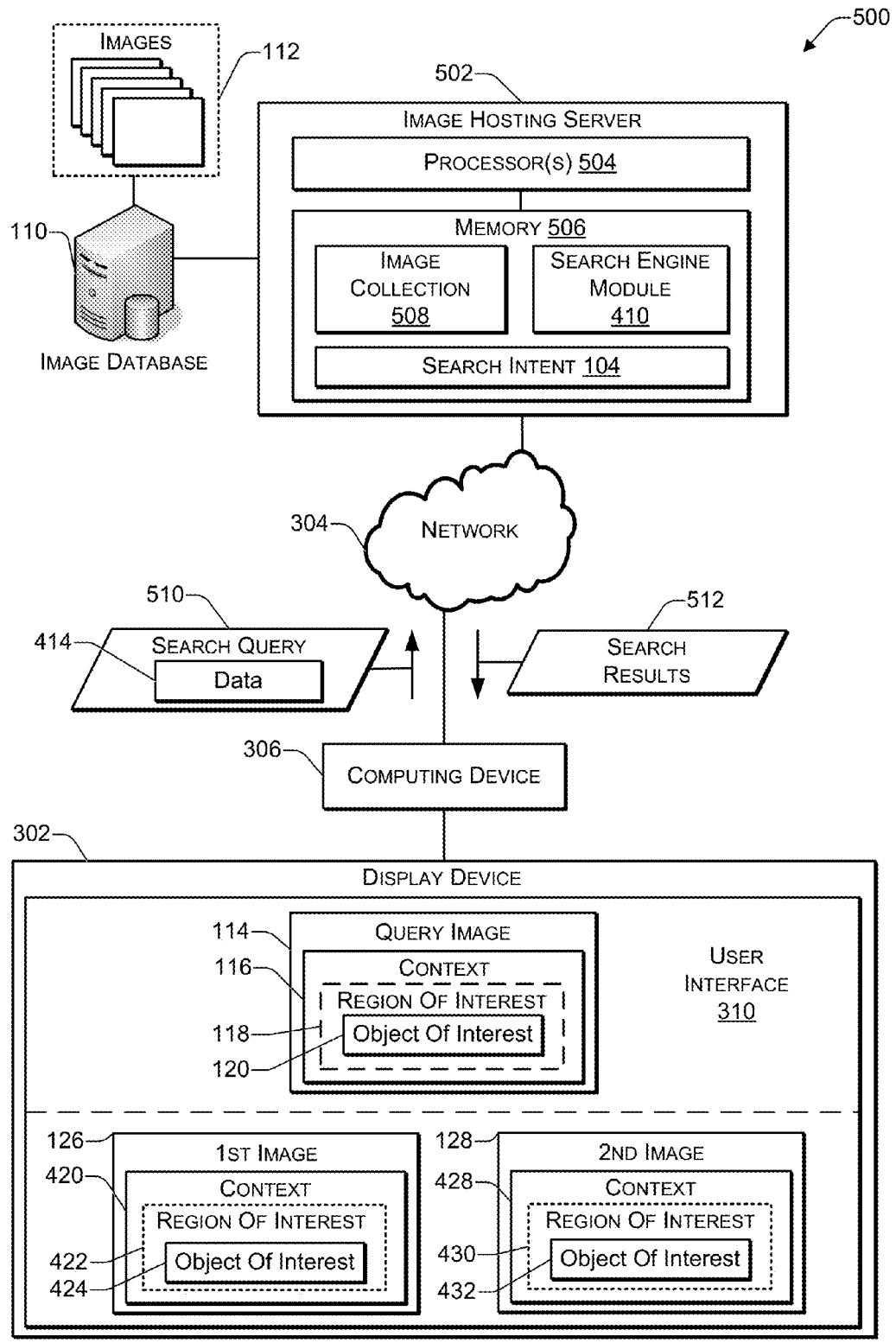
FIG. 5 illustrates an example framework for object retrieval according to some implementations.

FIG. 5 is a block diagram of an example architecture 500 including the search engine module 410 according to some implementations herein. In the illustrated example, the search engine module 410 may be executed according to the framework 100 and may use the dual-sigmoid approximations of search intent of FIG. 2, as described above. For example, the search engine module may include a plurality of computer-readable, processor-executable instructions and modules that may be executable by one or more processors 504 to form a particular machine for attaining the frameworks, processes and functions described herein.

The architecture 500 may include the computing device 306 coupled to an image hosting server 502 via the network 304. The computing device 306 may be coupled to the display device 302. The image hosting server 502 may be coupled to the image database that hosts the images 112.

The image hosting server 502 may include the one or more processors 504 and a memory 506. The memory 506 may include an image collection 508 and the search engine module 410. The search engine module 410 may use a context-based object retrieval framework. The image collection 508 may include one or more images uploaded by a user from the computing device 306 to the image hosting server 502 via the network 304.

In operation, the user may select the query image 114 and specify the region of interest 118. The user interface 310 may enable the user to send a search query 510 to the search engine module 410 at the image hosting server 502. The search query 316 may include data identifying the region of interest 118. The data may also include the query image 114 or include an address of the query image 114 to enable the search engine module 410 to access the query image 114. In addition, the search query 316 may identify a search target for the query. The search target may include the image collection 508, the image database 110, another image collection, or any combination thereof. For example, the user may wish to identify all images in the image collection 508 that include the object of interest 120. As another example, the user may wish to identify all images in the image database 110 that include the object of interest 120. As yet another example, the user may wish to identify all images in the image collection 508 and in the image database 110 that include the object of interest 120. As a further example, the user may wish to identify all images in a second image collection (not shown) that include the object of interest 120, where the second image collection is hosted by the image hosting server 502. The second image collection may be uploaded to the image hosting server 502 by a friend or relative of the user. For ease of understanding, the examples below assume the image database 110 is the search target.

After receiving the search query 510, the search engine module 410 may perform a context-based search of the image database 110 to determine if any of the images 112 matches the query image 114. For example, the search engine module 410 may determine a search intent based on one or more of the region of interest 118, the context 116, and the object of interest 120. Based on the search intent, the search engine module may identify one or more images (e.g., the first image 126 and the second image 128) that match the query image 114. The images 126 and 128 may be identified by comparing the visual words associated with the query image 114 to visual words associated with each of the images 112. The search engine module 410 may send search results 512 to the computing device 306 via the network 304. The computing device 306 may receive the search results 512 from the search engine module 410 and display the images 126 and 128 in the user interface 310.

Thus, the search engine module 410 executing at the image hosting server 502 may determine a search intent of the user based on the context 116 and the region of interest 118. Including the context 116 when determining the search intent may result in more accurate results than a conventional system. The search engine module 410 may use a context-based image retrieval framework to perform a search of one or more of the image database 110, the image collection 508, and a second image collection (not shown), to identify one or more images 126 and 128 that match the query image 114.

Furthermore, while FIG. 3, FIG. 4, and FIG. 5 set forth examples of suitable architectures that include a search engine 102 or a search engine module 410, numerous other possible architectures, frameworks, systems and environments will be apparent to those of skill in the art in view of the disclosure herein. Additionally, while the examples herein have been described in the environment of image retrieval, other implementations may be directed to other types of image search and image retrieval applications. Thus, the implementations herein may be extended to other types of applications, such as image recognition, object retrieval, and visual search.

Example Processes

Figure 6:
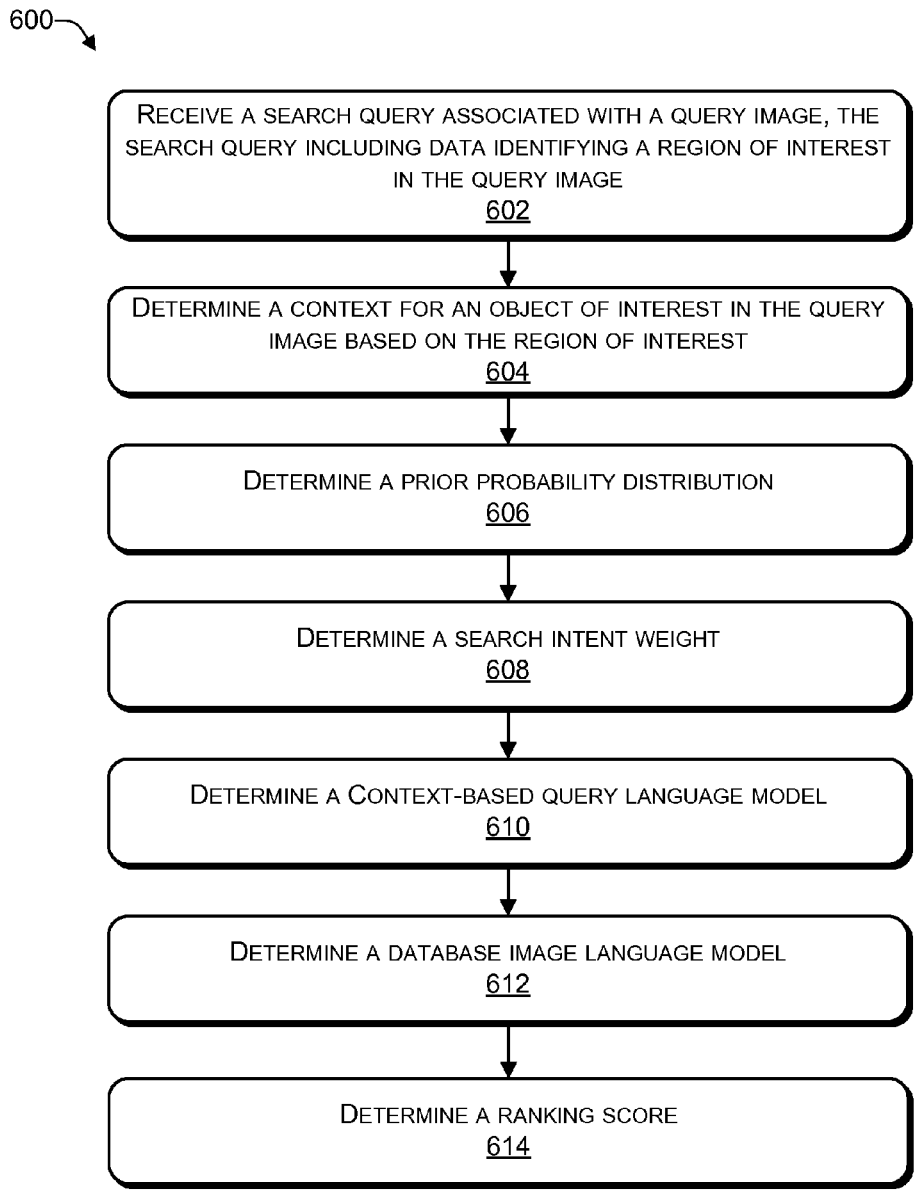
FIG. 6 is a flow diagram of an example process that includes object retrieval according to some implementations.
Figure 7:
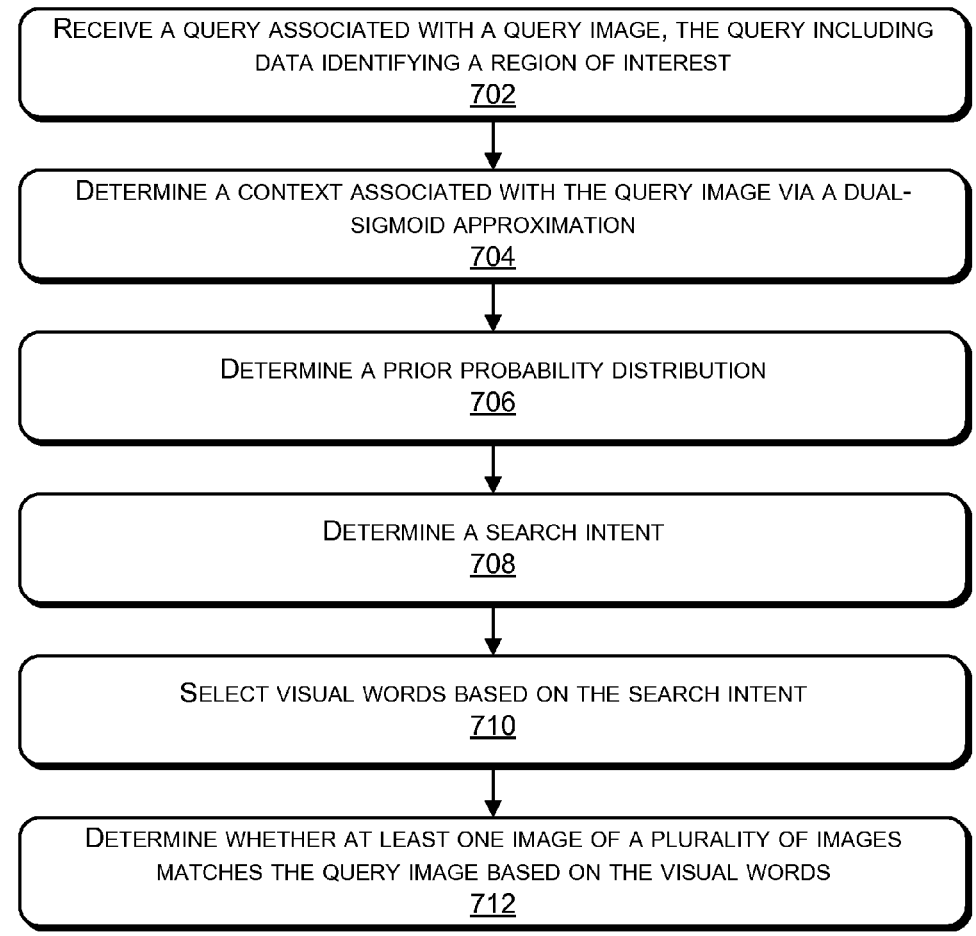
FIG. 7 is a flow diagram of an example process that includes object retrieval according to some implementations.
Figure 8:
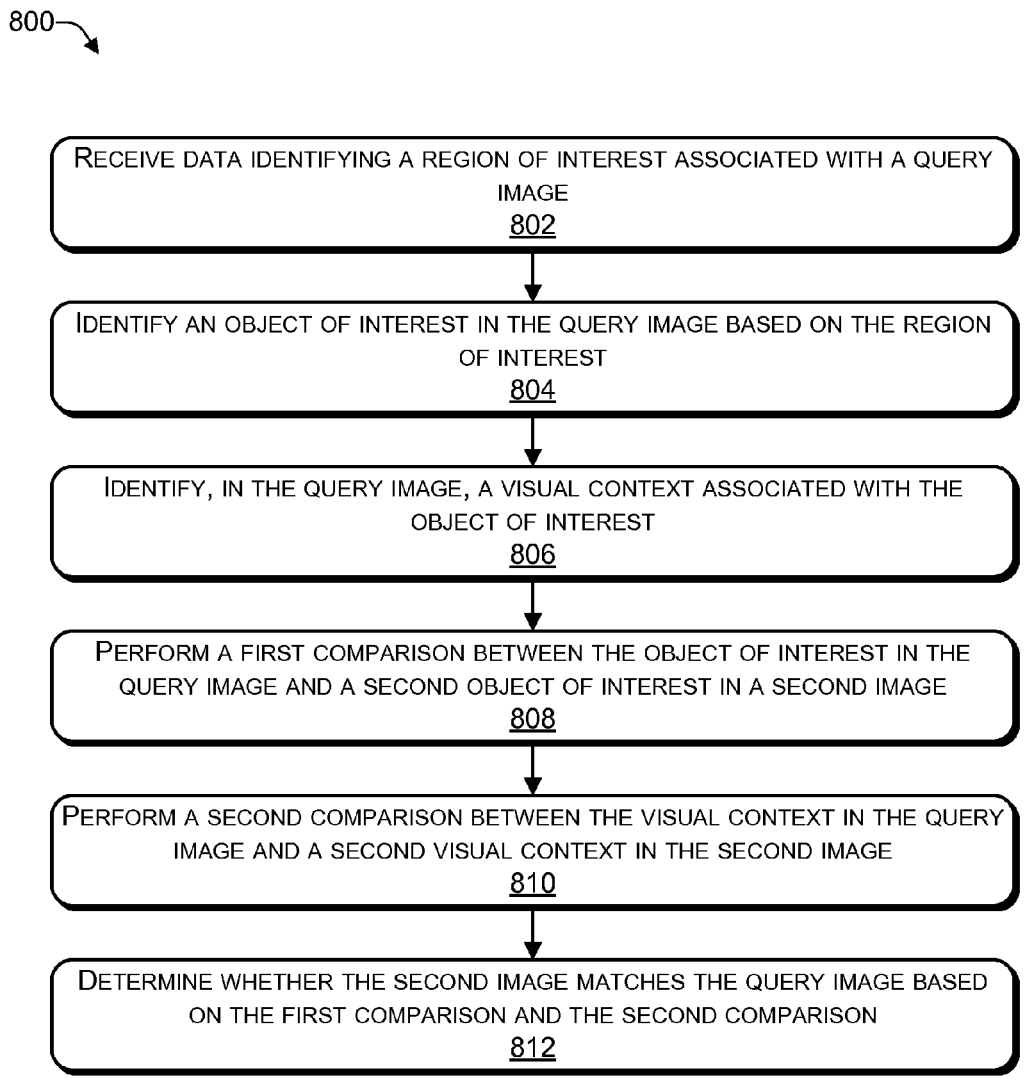
FIG. 8 is a flow diagram of an example process that includes object retrieval according to some implementations.

In the flow diagrams of FIGS. 6, 7, and 8, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 600, 700 and 800 are described with reference to the architectures 300, 400, and 500, respectively, as described above, although other models, frameworks, systems and environments may implement these processes.

FIG. 6 is a flow diagram of an example process that includes object retrieval according to some implementations. At block 602, the search engine receives a search query associated with the query image 114. The search query may include data identifying the region of interest 118 (e.g., a bounding box) in the query image 114. For example, the search engine 102 may receive the search query 316 identifying the query image 114 for comparing with one or more other images 112 to determine whether there is a match between the query image 114 and the one or more other images 112.

At block 604, the search engine determines a context for an object of interest in the query image based on the region of interest. The context may be determined using a dual-sigmoid approximation via equation (17).

At block 606, the search engine determines a prior probability distribution using equation (15).

At block 608, the search engine determines a search intent weight using equation (18).

At block 610, the search engine determines a query language model using equation (9).

At block 612, the search engine determines a database image language model using equation (6).

At block 614, the search engine determines a ranking score using equation (3).

FIG. 7 is a flow diagram of an example process that includes object retrieval according to some implementations.

At block 702, a search engine module receives a query associated with a first image. The query includes data identifying a region of interest. For example, the search engine module 410 may receive the search query 412 associated with the query image 114. The search query 412 may include the data 414 identifying the region of interest 118.

At block 704, the search engine module determines a context associated with the query image via the dual-sigmoid approximation of equation (17).

At block 706, the search engine module determines a prior probability distribution using equation (15).

At block 708, the search engine module determines a search intent associated with the query using equation (18).

At block 710, the search engine module selects visual words based on the search intent. For example, the search engine module 410 may select the first visual words 418 based on the search intent 104. To illustrate, the query language model may be determined using equation (9) and the database image language model may be determined using equation (6).

At block 712, the search engine module determines whether at least one image of a plurality of images matches the first image based on the visual words. For example, the search engine module 410 may determine whether at least one image of the images 112 matches the first image 114 based on the first visual words 418. The results of the search (e.g., the matching images 112) may be ranked using equation (3). For example, the first image 126 may have the highest rank, indicating that the first image 126 has a higher probability of matching the object of interest 120 in the query image 114 as compared to the second image 128.

FIG. 8 is a flow diagram of an example process that includes object retrieval according to some implementations.

At block 802, a search engine module receives data identifying a region of interest associated with a first image. For example, the search engine 414 may receive the search query 510 including the data 414 identifying the region of interest 118 of the first image 114.

At block 804, the search engine module identifies an object of interest in the first image based on the region of interest. At block 806, the search engine module identifies, in the first image, a visual context associated with the object of interest. For example, the search engine module 410 may identify the object of interest 120 and the context 116 based on the region of interest 118.

At block 808, the search engine module performs a first comparison between the object of interest in the first image and a second object of interest in a second image. For example, the search engine module 410 may perform a first comparison between the object of interest 120 in the query image 114 and the object of interest 424 in the first image 126.

At block 810, the search engine module performs a second comparison between the visual context in the first image and a second visual context in the second image. For example, the search engine module 410 may perform a second comparison between the context 116 in the query image 114 and the context 428 in the first image 126. The first comparison and the second comparison may be performed in a single, indivisible operation (e.g., substantially simultaneously).

At block 812, the search engine module determines whether the second image matches the first image based on the first comparison and the second comparison. For example, the search engine module 410 may determine whether first image 126 matches the query image 114 based on the first comparison between the object of interest 120 in the query image 114 and the object of interest 424 in the first image 126 and based on the second comparison between the context 116 in the first image and the context 428 in the first image 126.

Example Computing Device and Environment

Figure 9:
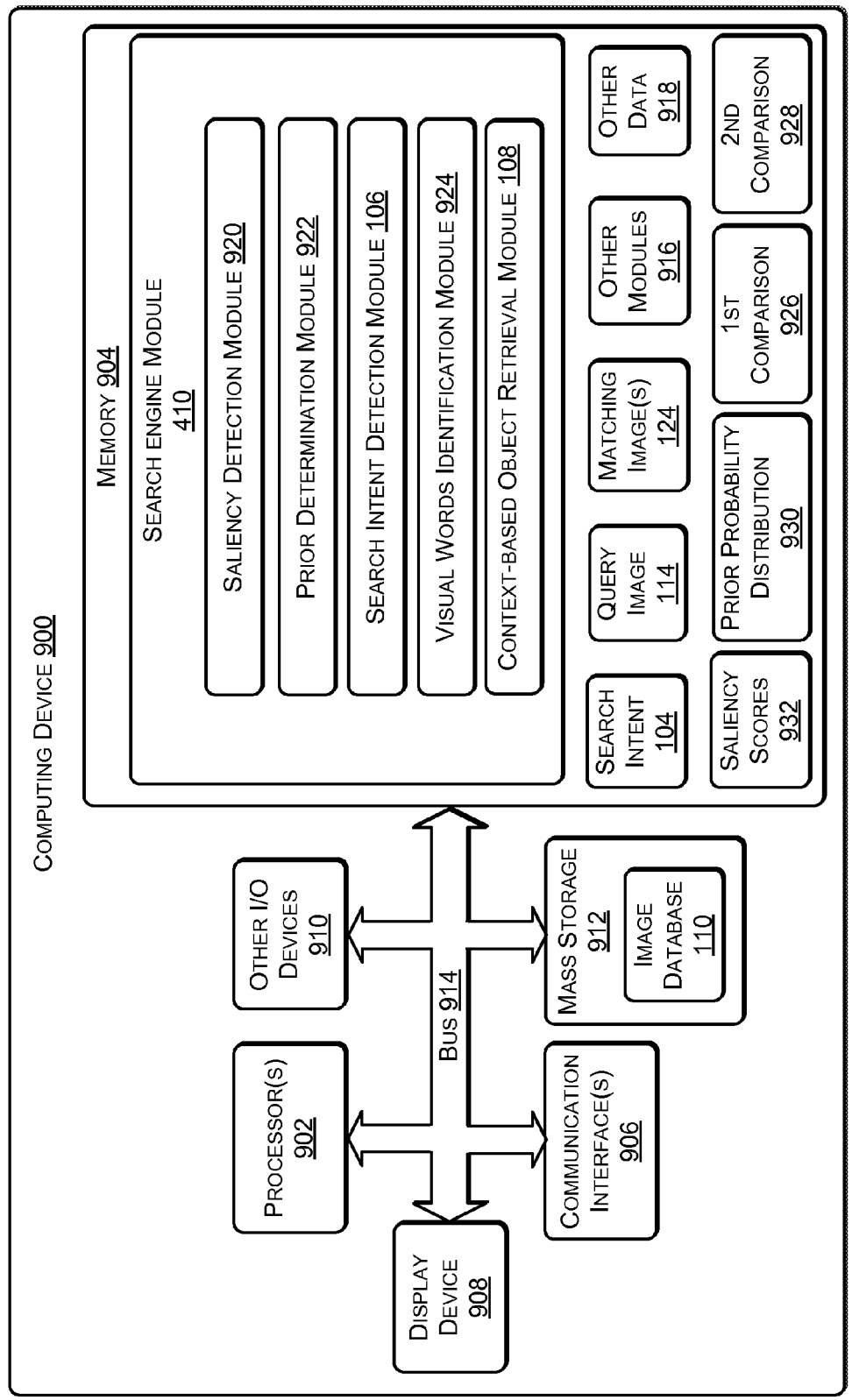
FIG. 9 is a block diagram of an example computing device and environment according to some implementations.

FIG. 9 illustrates an example configuration of a computing device 900 and environment that can be used to implement the modules and functions described herein. The computing device 900 may include at least one processor 902, a memory 904, communication interfaces 906, a display device 908, other input/output (I/O) devices 910, and one or more mass storage devices 912, able to communicate with each other, such as via a system bus 914 or other suitable connection.

The processor 902 may be a single processing unit or a number of processing units, all of which may include single or multiple computing units or multiple cores. The processor 902 can be implemented as one or more microprocessors, microcomputers, microcontrollers, digital signal processors, central processing units, state machines, logic circuitries, and/or any devices that manipulate signals based on operational instructions. Among other capabilities, the processor 902 can be configured to fetch and execute computer-readable instructions stored in the memory 904, mass storage devices 912, or other computer-readable media.

Memory 904 and mass storage devices 912 are examples of computer storage media for storing instructions which are executed by the processor 902 to perform the various functions described above. For example, memory 904 may generally include both volatile memory and non-volatile memory (e.g., RAM, ROM, or the like). Further, mass storage devices 912 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 904 and mass storage devices 912 may be collectively referred to as memory or computer storage media herein, and may be a non-transitory media capable of storing computer-readable, processor-executable program instructions as computer program code that can be executed by the processor 902 as a particular machine configured for carrying out the operations and functions described in the implementations herein.

The computing device 900 may also include one or more communication interfaces 906 for exchanging data with other devices, such as via a network, direct connection, or the like, as discussed above. The communication interfaces 906 can facilitate communications within a wide variety of networks and protocol types, including wired networks (e.g., LAN, cable, etc.) and wireless networks (e.g., WLAN, cellular, satellite, etc.), the Internet and the like. Communication interfaces 906 can also provide communication with external storage (not shown), such as in a storage array, network attached storage, storage area network, or the like.

A display device 908, such as a monitor may be included in some implementations for displaying information and images to users. Other I/O devices 910 may be devices that receive various inputs from a user and provide various outputs to the user, and may include a keyboard, a remote controller, a mouse, a printer, audio input/output devices, and so forth.

Memory 904 may include modules and components for context-based object retrieval according to the implementations herein. In the illustrated example, memory 904 includes the search engine module 410. For example, the search engine module 410 may include a saliency detection module 920, a prior determination module 922, the search intent detection module 106, a visual words identification module 924, and the context-based object retrieval module 108. The saliency detection module 920 may determine contrast-based saliency scores 932 based on equation (14). The prior determination module 922 may determine a prior probability distribution 930 based on the saliency scores 932 using the equation (15). The search intent detection module 106 may determine the search intent 104 based on equation (3). The visual words identification module 924 may identify and/or select visual words (e.g., the visual words 418, 426, and 434) for one or more images. The context-based object retrieval module 108 may receive the query image 114 and identify the matching images 124 from the image database 110 based on equations (7) and (8).

Memory 904 may also include other data and data structures described herein, such as the search intent 104, the query image 114, the matching images 124, the saliency scores 932, the prior distribution probability 934, and results of comparing the query image 114 with the first image 126 and the second image 128, as exemplified by a first comparison 926 and a second comparison 928. Memory 904 may further include one or more other modules 916, such as an operating system, drivers, communication software, or the like. Memory 904 may also include other data 918, such as data stored while performing the functions described above and data used by the other modules 916.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although illustrated in FIG. 9 as being stored in memory 904 of computing device 900, search engine module 410 or portions thereof, may be implemented using any form of computer-readable media that is accessible by computing device 900. As used herein, "computer-readable media" includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
under control of one or more processors specifically configured with executable instructions,
receiving, at a search engine, a query associated with a query image, the query image including a plurality of pixels;
categorizing a first portion of the plurality of pixels as foreground pixels;
categorizing a second portion of the plurality of pixels as background pixels;
determining saliency scores for each of the plurality of pixels based on the foreground pixels and the background pixels, the saliency scores comprising contrast-based saliency scores;
normalizing the saliency scores to create normalized saliency scores;
transforming the normalized saliency scores to create a prior probability distribution;
determining a search intent based on the prior probability distribution using a dual-sigmoid approximation; and
identifying, from a set of images, one or more images that match the query image based on the search intent.

2. The method of claim 1, wherein the query includes a region of interest that includes at least a portion of the image.

3. The method of claim 2, wherein the region of interest is specified by a bounding box having a geometric shape.

4. The method of claim 1, wherein identifying, from the set of images, the one or more images that match the query image comprises:
determining query visual words to represent the query image;
comparing the query visual words with visual words associated with each image of the set of images; and
determining that a particular image of the set of images matches the query image when a number of query visual words that match particular visual words associated with the particular image satisfies a threshold.

5. The method of claim 1, further comprising providing the one or more images that match the query image to a client device that originated the query.

6. The method of claim 1, wherein the dual-sigmoid approximation includes a first sigmoid approximation that is used for a first dimension of the query image and a second sigmoid approximation that is used for a second dimension of the query image.

7. Computer-readable storage media including instructions executable by one or more processors to perform operations comprising:
receiving data identifying a region of interest associated with a first image, the first image including a plurality of pixels;
determining contrast-based saliency scores for each of the plurality of pixels;
normalizing the contrast-based saliency scores to create normalized saliency scores;
determining transforming the normalized saliency scores to create a prior probability distribution;
determining a search intent based on a dual-sigmoid approximation in which a first sigmoid approximation is used for a first dimension of the region of interest and a second sigmoid approximation is used for a second dimension of the region of interest; and
performing a first comparison between the first image and a second image based on the search intent.

8. The computer-readable storage media of claim 7, the operations further comprising providing an indication that the second image matches the first image based on the first comparison.

9. The computer-readable storage media of claim 7, the operations further comprising:
performing a second comparison between the first image and a third image based on the region of interest.

10. The computer-readable storage media as recited in claim 9, the operations further comprising providing a second indication that the third image matches the first image based on the second comparison.

11. The computer-readable storage media of claim 7, wherein performing the first comparison between the object of interest in the first image and the second object of interest in the second image comprises:
determining first visual words associated with the object of interest in the first image;
determining second visual words associated with the second object of interest in the second image; and
comparing the first visual words with the second visual words.

12. The computer-readable storage media of claim 7, wherein performing the second comparison between the visual context in the first image and the second visual context in the second image comprises:
determining third visual words associated with the visual context in the first image;
determining fourth visual words associated with the second visual context in the second image; and
comparing the third visual words with the fourth visual words.

13. A computing device comprising:
one or more processors;
computer-readable storage media accessible to the one or more processors;
a communication interface to receive a query associated with a first image, the query including data identifying a region of interest that includes a portion of the first image;
a saliency detection module to determine contrast-based saliency scores for the first image, normalize the saliency scores to create normalized saliency scores, and determine a prior probability distribution based on the normalized saliency scores;
a search intent detection module to determine a search intent associated with the query based on the prior probability distribution, the search intent determined via a dual-sigmoid approximation, the dual sigmoid function including a first sigmoid function associated with a first dimension of the region of interest and a second sigmoid function associated with a second dimension of the region of interest;
a visual words identification module to select visual words based on the search intent; and
a context-based object retrieval module to perform a search of a plurality of images based on the visual words to determine whether at least one image, of the plurality of images matches the first image.

14. The computing device of claim 13, wherein the region of interest is specified by a geometric shape.

15. The computing device of claim 14, wherein the geometric shape is one of a square, trapezoid, a rhombus, and a circle.

16. The computing device of claim 13, wherein the region of interest is specified by a free-form shape drawn by a user.

17. The computing device of claim 13, wherein the context-based search module is operable to compare the visual words with second visual words associated with a particular image of the plurality of images.

18. The computing device of claim 17, wherein the context-based search module is operable to determine that the particular image matches the first image in response to determining that a threshold number of the visual words match the second visual words.

19. The computing device of claim 13, wherein:
the region of interest includes an object of interest; and
the query includes a request to identify additional images that include the object of interest.

20. The computer-readable storage media of claim 7, wherein:
the region of interest includes an object of interest; and
the data is included in a query to identify other images that include the object of interest.

* * * * *